W. H. BRACE.
PISTON.
APPLICATION FILED NOV. 18, 1919.
1,355,030.
Patented Oct. 5, 1920.
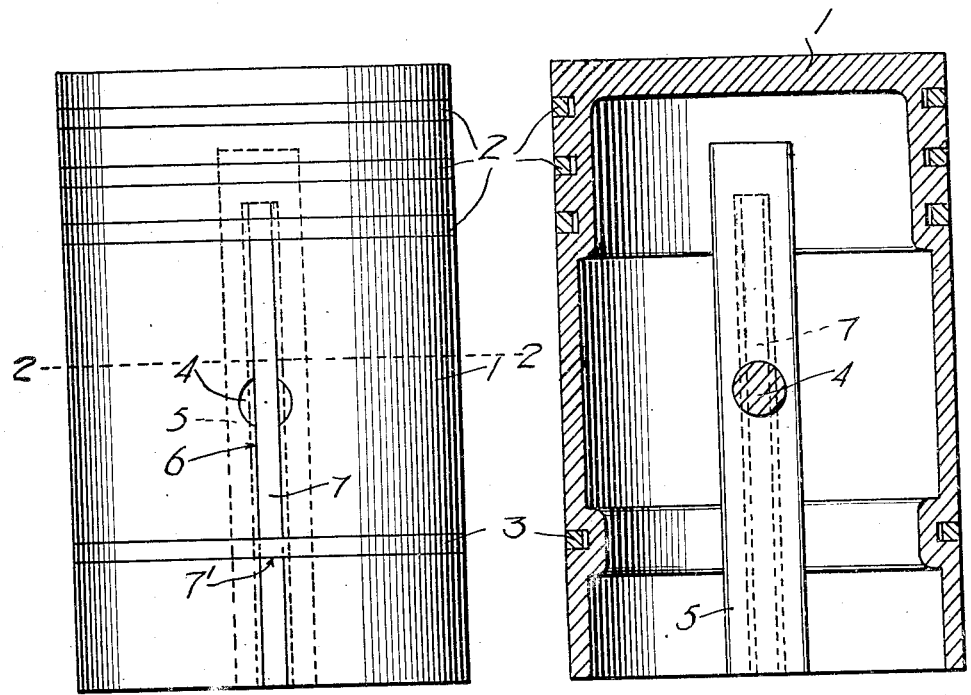
Fig.1
Fig.3
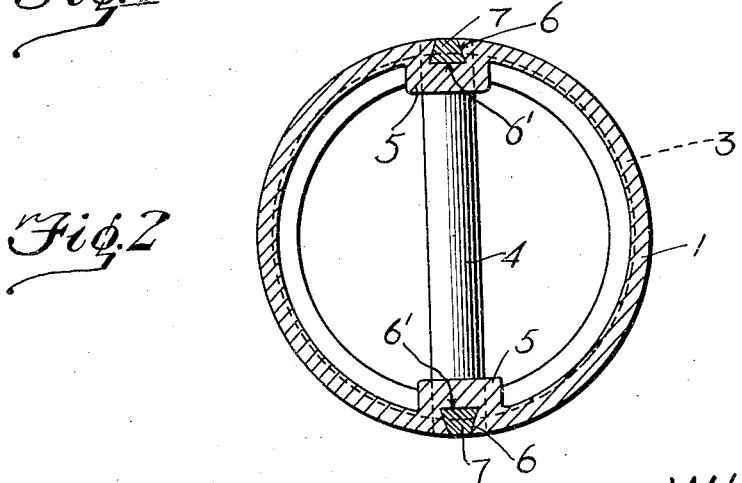
Fig.2
WITNESS:
H. B. Kirkman
W. H. Brace
INVENTOR.
BY
Victor J. Evans
ATTORNEY.

UNITED STATES PATENT OFFICE.

WILLIAM H. BRACE, OF PHILADELPHIA, PENNSYLVANIA.

PISTON.

1,355,030.  Specification of Letters Patent.  Patented Oct. 5, 1920.

Application filed November 18, 1919.  Serial No. 338,893.

*To all whom it may concern:*

Be it known that I, WILLIAM H. BRACE, a citizen of the United States, residing at Philadelphia, in the county of Philadelphia and State of Pennsylvania, have invented new and useful Improvements in Pistons, of which the following is a specification.

This invention relates to improvements in pistons and the principal object of the invention is to provide means for preventing the wrist pin of the piston from rotating therein and for holding said wrist pin against endwise movement.

Another object of the invention is to provide a key for engaging the wrist pin and means for holding the keys in position by one of the piston rings.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a piston constructed in accordance with my invention.

Fig. 2 is a section on line 2—2 of Fig. 1.

Fig. 3 is a section on line 3—3 of Fig. 1.

In these views 1 indicates the piston which is provided with grooves for receiving the upper piston rings 2 and the lower ring 3. 4 indicates the wrist pin which passes transversely through the piston with its ends seated in holes formed in the walls of the piston. This pin receives the upper end of the connecting rod as will be understood.

In carrying out my invention I thicken the walls of the cylinder at diametrically opposite points by forming a pair of inwardly extending oblong projections 5 on the inner walls of the piston. These projections extend from the lower end of the piston to a point above the openings for the wrist pin and these openings pass through the projections.

Dovetailed grooves 6 are formed in the thickened parts of the walls and these grooves extend along the longitudinal center of the projections as shown. The ends of the wrist pin are also provided with dovetailed grooves 6' which register with the grooves in the projections. After this wrist pin is in position a key 7 is driven into each groove and this key passes through the grooves in the end of the wrist pin. Thus the wrist pin is held against rotation and endwise movement by the keys. Slots 7' are formed in each key and when the keys are driven home these slots will register with the grooves in the piston which receives the lower rings 2 and 3. In this way when the rings are inserted they will engage slots 7 in the keys and thus these keys will be held against longitudinal movement.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A piston of the class described having longitudinal grooves in its outer walls, said grooves being diametrically arranged, a wrist pin having grooves in its ends, said grooves registering with the before mentioned grooves and longitudinal keys engaging said grooves for holding the wrist pin against rotation and endwise movement.

2. A piston of the class described having grooves in its outer walls, a wrist pin having grooves in its ends registering with the before mentioned grooves, keys engaging said grooves for preventing rotation and endwise movement of the wrist pin, said keys having notches therein registering with one of the piston ring grooves in the piston and adapted to be engaged by the piston ring for holding the keys in place.

3. A piston of the class described having diametrically opposed inwardly extending projections on its inner walls, said projections receiving the holes for the wrist pin, the outer walls of said piston having dovetailed grooves which extend into said projections, a wrist pin having dovetailed grooves in its ends which register with the before mentioned grooves, keys engaging with said grooves for holding the wrist pin against rotation and endwise movement and said keys having notches therein registering with the piston ring groove and engaged by the piston ring.

In testimony whereof I affix my signature.

WILLIAM H. BRACE.